US009646155B2

(12) United States Patent
Singla et al.

(10) Patent No.: US 9,646,155 B2
(45) Date of Patent: May 9, 2017

(54) SYSTEMS AND METHODS FOR EVALUATION OF EVENTS BASED ON A REFERENCE BASELINE ACCORDING TO TEMPORAL POSITION IN A SEQUENCE OF EVENTS

(75) Inventors: Anurag Singla, Cupertino, CA (US); Robert Block, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/239,885

(22) PCT Filed: Oct. 20, 2011

(86) PCT No.: PCT/US2011/057139
§ 371 (c)(1),
(2), (4) Date: Feb. 20, 2014

(87) PCT Pub. No.: WO2013/036269
PCT Pub. Date: Mar. 14, 2013

(65) Prior Publication Data
US 2014/0165140 A1    Jun. 12, 2014

Related U.S. Application Data

(60) Provisional application No. 61/532,968, filed on Sep. 9, 2011.

(51) Int. Cl.
*G06F 21/55* (2013.01)
*G06F 11/30* (2006.01)
(Continued)

(52) U.S. Cl.
CPC .......... *G06F 21/55* (2013.01); *G06F 11/3006* (2013.01); *G06F 11/3072* (2013.01);
(Continued)

(58) Field of Classification Search
CPC .. G06F 21/55; G06F 11/3072; G06F 11/3006; G06F 21/552; G06F 21/554;
(Continued)

(56) References Cited

U.S. PATENT DOCUMENTS 6,601,048 B1    7/2003   Gavan et al.
6,725,287 B1    4/2004   Loeb et al.
(Continued)

FOREIGN PATENT DOCUMENTS

JP    2003-141158 A    5/2003
JP    2007-536646 A    12/2007
(Continued)

OTHER PUBLICATIONS

International Searching Authority, Appl No. PCT/US2011/057139, filed Oct. 20, 2011, Search Report and Written Opinion, 8pp, dated Sep. 26, 2012.
(Continued)

*Primary Examiner* — Robert Leung
*Assistant Examiner* — Thomas Ho
(74) *Attorney, Agent, or Firm* — Brooks, Cameron & Huebsch, PLLC

(57) ABSTRACT

Systems and methods for evaluation of events are provided. A user-specific reference baseline comprising a set of temporally-ordered sequences of events. An event of a sequence of events in a current session is received. A determination is made as to whether the event at least partially matches the reference baseline using an attribute of the event and a temporal position of the event within the sequence of events in the current session.

20 Claims, 5 Drawing Sheets

(51) Int. Cl.
*H04L 12/26* (2006.01)
*H04L 29/06* (2006.01)

(52) U.S. Cl.
CPC .......... *G06F 21/552* (2013.01); *G06F 21/554* (2013.01); *H04L 43/067* (2013.01); *H04L 63/1408* (2013.01); *H04L 63/1416* (2013.01); *G06F 2221/2107* (2013.01); *G06F 2221/2125* (2013.01); *G06F 2221/2151* (2013.01)

(58) Field of Classification Search
CPC    H04L 43/067; H04L 63/1408; H04L 63/1416
USPC .......................................................... 726/1
See application file for complete search history.

(56) References Cited

U.S. PATENT DOCUMENTS

| | | | |
|---|---|---|---|
| 7,251,584 | B1 | 7/2007 | Perazolo et al. |
| 7,424,742 | B1 | 9/2008 | Dash et al. |
| 7,815,106 | B1 | 10/2010 | McConnell |
| 7,895,649 | B1* | 2/2011 | Brook et al. ................. 726/22 |
| 2002/0078381 | A1* | 6/2002 | Farley et al. ................. 713/201 |
| 2002/0107841 | A1 | 8/2002 | Hellerstein et al. |
| 2005/0203881 | A1 | 9/2005 | Sakamoto et al. |
| 2008/0222059 | A1* | 9/2008 | Baum-Waidner et al. ..... 706/12 |
| 2010/0094791 | A1 | 4/2010 | Miltonberger |
| 2010/0241974 | A1 | 9/2010 | Rubin et al. |
| 2011/0145185 | A1 | 6/2011 | Wang et al. |

FOREIGN PATENT DOCUMENTS

| | | |
|---|---|---|
| JP | 2010-050939 A | 3/2010 |
| JP | 4700884 B2 | 6/2011 |

OTHER PUBLICATIONS

"Transaction Guard," 2011, pp. 1-4, Research Paper, OneCore Industrial Resources Sdn Bhd.
Daisuke Itoh and Yuto Ohvvada, "ILP Method for Intrusion Detection using Frequent Patterns from Sequential Data", Meeting materiais for the Japanese Society for Artificial Intelligence (JSAI) (SIG-FAI-A0003), Japan, JSAI, Nov. 9, 2000, pp. 47-52.
Extended European Search Report, EP Application No. 11872086.1, Date: Jul. 27, 2015, pp. 1-5, EPO.

* cited by examiner

SYSTEMS AND METHODS FOR EVALUATION OF EVENTS BASED ON A REFERENCE BASELINE ACCORDING TO TEMPORAL POSITION IN A SEQUENCE OF EVENTS

I. CROSS-REFERENCES

This application claims priority from U.S. Provisional Patent Application No. 61/532,968, filed Sep. 9, 2011, titled "RULE-BASED ANALYSIS OF EVENTS BASED ON DEVIATION FROM A BASELINE," which is hereby incorporated by reference, as if set forth in full in this document, for all purposes. This application incorporates by reference in its entirety U.S. Pat. No. 7,984,502, filed Oct. 1, 2008, titled "PATTERN DISCOVERY IN A NETWORK SYSTEM."

II. BACKGROUND

Computer networks and systems have become indispensable tools for modern business. Today terabits of information on virtually every subject imaginable are stored in and accessed across such networks by users throughout the world. Much of this information is, to some degree, confidential and its protection is desired. Intrusion detection systems (IDS), including fraud detection systems (FDS), have been developed to detect unauthorized use of information and resources and to help uncover attempts by unauthorized persons and/or devices to gain access to computer networks and the information stored therein.

There are two complementary approaches to detecting intrusions: knowledge-based approaches and behavior-based approaches. Many IDS tools in use today are knowledge-based. Knowledge-based intrusion detection techniques involve comparing the captured data to information regarding existing techniques to exploit vulnerabilities. When a match is detected, an alarm is triggered. Behavior-based intrusion detection techniques, on the other hand, attempt to spot intrusions by observing deviations from normal or expected behaviors of the system or the users (models of which are extracted from reference information collected by various means). When a suspected deviation is observed, an alarm is generated.

Traditional security systems use rules to correlate events. Rules may be used to analyze and correlate user a events to identify intrusions, more specifically, behavioral patterns that deviate from the norm. While these mechanisms are powerful enough to support many standard correlation use cases, some intrusions, such as sophisticated fraudulent attacks, may go undetected or may be detected after specifying a highly complex set of rules.

III. BRIEF DESCRIPTION OF THE DRAWINGS

The present disclosure may be better understood and its numerous features and advantages made apparent by referencing the accompanying drawings.

IV. DETAILED DESCRIPTION

Figure 1:
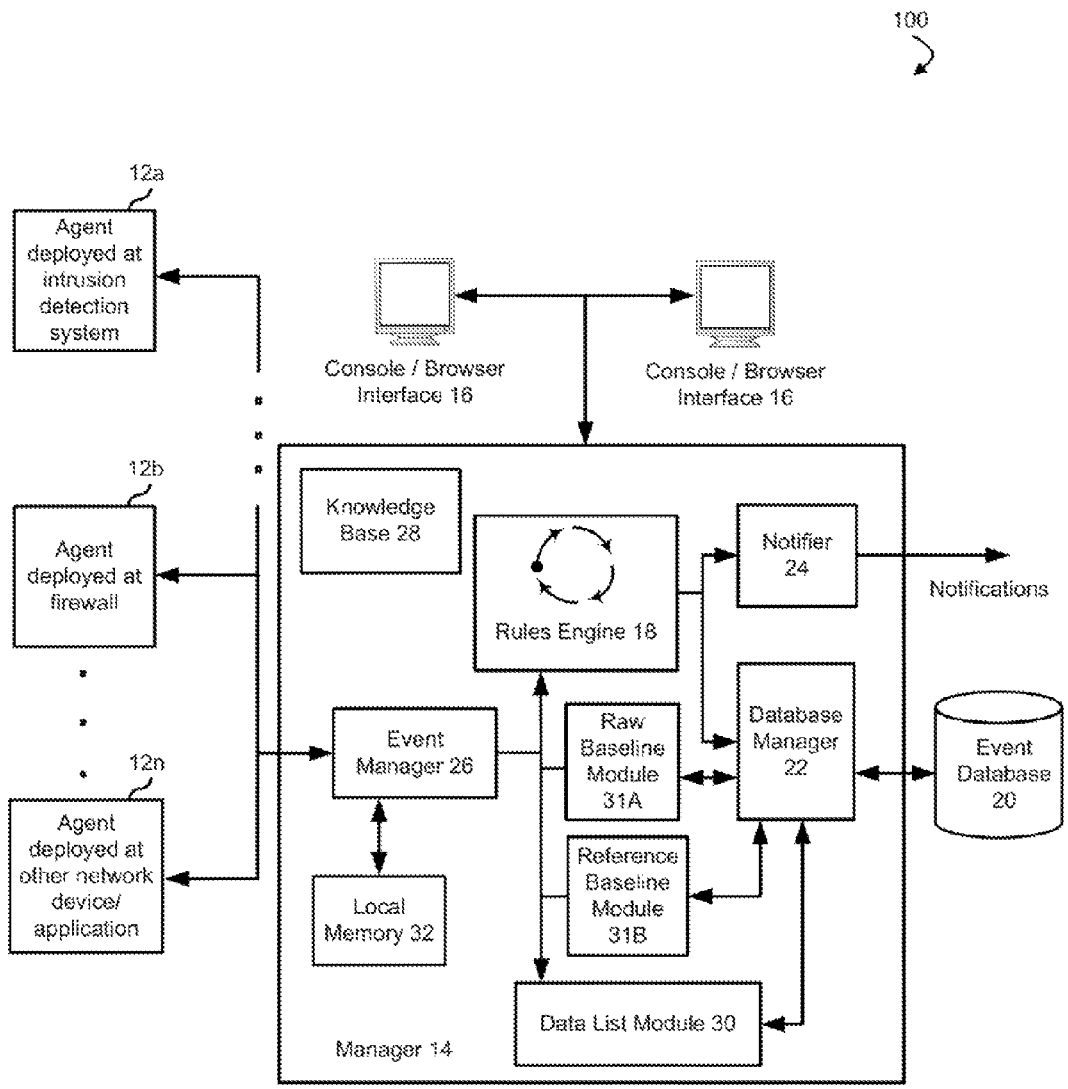
FIG. 1 is a topological block diagram of a network security system in accordance with an embodiment.

Security systems receive events from potentially thousands of sources. Events may be cross-correlated with rules to provide security-related intelligence that would not be identified by individual devices. In general, correlation can indicate that different events from different sources are associated with a common incident, as defined by correlation rules. More specifically, correlation includes, for example, discovering the relationships among events, inferring the significance of those relationships, prioritizing the events and meta-events, and providing a framework for taking action.

As used herein, a rule or a "correlation rule" is a procedure and comprises a set of simple or complex conditions which may be combined with other constructs such as aggregation, groupings, and triggers. A rule is used in many ways, such as: to evaluate incoming events for specific conditions and patterns; to correlate information from different events using rule correlation as well as other constructs like active lists, session lists, and threat level calculations; to infer meaning about significance of events; and to initiate actions in response to events.

In other words, rules express conditions against which event streams are evaluated. The outcome of the evaluation provides information to derive the meaning out of the event streams. When a match is determined, the rule may initiate an action in response.

In addition to conditions, a rule may further include a threshold i.e., number of occurrences, running total), a time duration, join criterion, and/or an aggregation criterion. For example:

If (failed login attempt) occurs (from the same source IP address) (10 times) within (1 minute) then (Action).

For this rule, the condition is "failed login attempt." the threshold number of occurrences is "10," the time duration is "1 minute," and the aggregation criterion is "from the same source IP address."

Rule conditions may refer to various data models. For example, a rule condition may refer to fields or properties of a network and asset model, which is a representation of nodes and/or machines on a network. The properties may include open ports, operating system, vulnerabilities, business classification, etc.

A rule condition may also refer to a data list, such as an active list and session list. Session lists associate users with their event traffic on the network. More specifically, a session list is a configurable table that maintains temporal data related to user sessions (e.g., DHCP session information, VPN session information, mappings from users to their roles and the corresponding period of time for which those attributes are valid, etc.).

An active list is a configurable table that aggregates specified fields of events. Active lists provide tracking for specific events over a period of time (e.g., days, weeks, etc.). The aggregated data may be made available for correlation. For example, a data list may keep track of a running total of purchases made using a particular credit card for a billing cycle. The running total is referenced by a rule, for example, to alert the credit card holder of reaching a credit limit.

In the context of intrusion detection, temporally-ordered sequences of user action events and a time gap between each of these events is relevant for identifying anomalies and abnormal behavior. More specifically, the comparison of a user's activity to that user's baseline behavior is relevant for the timely detection of anomalies for fraud detection.

However, rules are generally static in nature and are thus insufficient to capture the differences in patterns of activities among all users in a network and/or system. Furthermore, traditional rules engines allow the specification of rules that correlate events using simple join conditions, which typically relate different events based on matching field values, and threshold conditions that specify the number of events that need to occur in a certain time period. While these mechanisms are powerful enough to support many standard correlation use cases, the detection of sophisticated fraudulent attacks often demands more complex conditions than can be easily specified in this manner.

Moreover, a complicated set of static rules may be used to capture sequences of events and detect missing events within a specified event sequence. For a sequence with more than two events, detecting all possible sequence deviations would demand creating an exponential number of rules, including rules that chain other rules to implement a state machine, for example.

A framework to detect anomalies in web-based financial transactions (e.g., account access) behavior and other types of user action events is described, according to one embodiment. A user-specific baseline is determined based on an identified pattern of a temporally-ordered sequence of events and/or based on time gaps between each of the events in the sequence. Rules may be used to detect when an online transaction is likely to be fraudulent based on the properties of the online session. Events corresponding to a user's interaction with an online account or other session (e.g., web session), are compared against the user-specific baseline. Significant deviations from a user's baseline or expected behavior may be flagged as a potential fraud. Furthermore, the fraudulent/suspicious events may be correlated with security information to provide a more complete view of the system by tapping-in to previously disparate sections of a security system.

In the case of online financial transaction fraud, detection is based on analysis of a user's online session. For a particular user, a normal online session might entail visiting seven web pages in a particular order, i.e., login page, homepage, account balance page, transfer funds page, etc. In this example, the fund transfer transaction is completed in about five minutes. If, in a particular instance, this user skips an otherwise usual step for this transaction (i.e., does not navigate to the account balance page), executes steps out of the expected order, spends merely 20 seconds before completing the transaction during a session, or the time interval between the expected steps deviates significantly from the normal behavior for that user, the anomaly may be indicative of fraudulent access.

Systems and methods for evaluation of events are provided, in one embodiment. A user-specific reference baseline comprising a set of temporally-ordered sequences of events is generated. An event of a sequence of events in a current session is received. A determination is made as to whether the event at least partially matches the reference baseline using an attribute of the event and a temporal position of the event within the sequence of events in the current session. A condition of a rule is analyzed, and a correlation event is generated.

FIG. 1 is a topological block diagram of a network security system 100 in accordance with an embodiment. System 100 includes agents 12*a-n*, at least one manager 14 and at least one console 16 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system grows.

Agents 12*a-n* are software programs, which are machine readable instructions, that provide efficient, real-time (or near real-time) local event data capture and filtering from a variety of network security devices and/or applications. The typical sources of security events are common network security devices, such as firewalls, intrusion detection systems and operating system logs. Agents 12*a-n* can collect events from any source that produces event logs or messages and can operate at the native device, at consolidation points within the network, and/or through simple network management protocol (SNMP) trans.

Agents 12*a-n* are configurable through both manual and automated processes and via associated configuration files. Each agent 12 may include at least one software module including a normalizing component, a time correction component, an aggregation component, a batching component, a resolver component, a transport component, and/or additional components. These components may be activated and/or deactivated through appropriate commands in the configuration file.

Manager 14 may be comprised of server-based components that further consolidate, filter and cross-correlate events received from the agents, employing a rules engine 18 and a centralized event database 20. One role of manager 14 is to capture and store all of the real-time and historic event data to construct (via database manager 22) a complete, enterprise-wide picture of security activity. The manager 14 also provides centralized administration, notification (through at least one notifier 24), and reporting, as well as a knowledge base 28 and case management workflow. The manager 14 may be deployed on any computer hardware platform and one embodiment utilizes a database management system to implement the event data store component. Communication, between manager 14 and agents 12*a-n* may be bi-directional (e.g., to allow manager 14 to transmit commands to the platform hosting agents 12*a-n*) and encrypted. In some installations, managers 14 may act as concentrators for multiple agents 12*a-n* and can forward information to other managers (e.g., deployed at a corporate headquarters).

Manager 14 also includes at least one event manager 26, which is responsible for receiving the event data messages transmitted by agents 12*a-n* and/or other managers, and receiving event summary data from other managers. Event manager 26 is also responsible for generating event data messages such as correlation events and audit events. Where bi-directional communication with agents 12*a-n* is implemented, event manager 26 may be used to transmit messages to agents 12*a-n*. If encryption is employed for agent-manager communications, event manager 26 is responsible for decrypting the messages received from agents 12*a-n* and encrypting any messages transmitted to agents 12*a-n*.

Once the event data messages have been received, the event data is passed to the rules engine 18. Rules engine 18 is configured to cross-correlate the event data with correlation rules in order to identify rule matches.

The actions triggered by the rules may include notifications transmitted (e.g., via notifier 24) to designated destinations (e.g., security analysts may be notified via the consoles 16, email messages, a call to a telephone, cellular telephone, voicemail box and/or pager number or address, or by way of a message to another communication device and/or address such as a facsimile machine, etc.) and/or instructions to network devices (e.g., via agents 12, etc.).

Consoles 16 are computer- (e.g., workstation-) based applications that allow security professionals to perform day-to-day administrative and operation tasks such as event monitoring, rules authoring, incident investigation and reporting. A single manager 14 can support multiple consoles 16.

In some embodiments, a browser-based version of the insole 16 may be used to provide access to security events, knowledge base articles, reports, notifications and cases. That is, the manager 14 may include a web server component accessible via a web browser hosted on a personal or handheld computer (which takes the place of console 16) to provide some or all of the functionality of a console 16. Browser access is particularly useful for security professionals that are away from the consoles 16 and for part-time users. Communication between consoles 16 and manager 14 is bi-directional and may be encrypted.

Through the above-described architecture, a centralized or decentralized environment may be supported. This is useful because an organization may want to implement a single instance of system 100 and use an access control list to partition users. Alternatively, the organization may choose to deploy separate systems 100 for each of a number of groups and consolidate the results at a "master" level. Such a deployment can also achieve a "follow-the-sun" arrangement where geographically dispersed peer groups collaborate with each other bypassing oversight responsibility to the group currently working standard business hours. Systems 100 can also be deployed in a corporate hierarchy where business divisions work separately and support a roll-up to a centralized management function.

The network security system 100 also includes anomaly detection capabilities. In one embodiment, manager 14 further includes a raw baseline module 31A, reference baseline module 31B, and a local memory 32.

Raw baseline module 31A is configured to receive a set of events, such as security events from at least one of agents 12*a-n* via event manager 26, from event database 20 via the database manager 22, or from event manager 26. Raw baseline module 31A is further configured to group the events per-user and per-session, using a user ID and session ID, respectively, as provided in an event.

Grouping by session may be performed, for example, according to a session identifier (ID) (e.g., web session identifier) of an event. In another embodiment, the session-based grouping may be performed by examining the timestamp of an event and determining a set of events to be a part of a same session where the timestamps of the events in the set are close in time proximity. In other words, the events are grouped by time proximity among the events (e.g., transactions).

Raw baseline module 31A is further configured to identify a sequence of user actions taken during the session and the time gaps between those actions, generating a raw baseline. Raw baseline module 31 is configured to store the raw baseline in a data list, such as an active list and/or session list of data list module 30.

Reference baseline module 31B is configured to generate a reference baseline against which a sequence of received events are analyzed to identify anomalies. The reference baseline module 31B is more specifically configured to identify common and distinctive patterns of temporally-ordered sequences of events that make up the historical record on a per-user basis, using the raw baselines. Furthermore, the time gaps between each of the events in a distinctive sequence of events is determined.

The reference baseline nodule 31B is further configured to compute statistics about an event flow, including the number of occurrences of individual events across all the sessions for a particular event flow. Raw baseline module 31A and reference baseline module 31B may be standalone modules, as shown, or may be integrated with another component, such as rules engine 18.

Rules engine 18 is configured to receive a set of events, such as security events from at least one of agents 12*a-n* via event manager 26, from event database 20 via the database manager 22, or from event manager 26. Furthermore, rules engine 18 is configured to compare a sequence of incoming events and time data (including time gaps) of a current session to the reference baseline associated with the particular user, and initiate a rule firing where the current session information does not match with a reference baseline.

The network security system 100 also includes data list capabilities, in one embodiment, manager 14 further includes a data list module 30 and a local memory 32. Data list module 30 is configured to maintain session lists and/or active lists. Furthermore, data list module 30 is configured to receive a set of events, such as security events from at least one of agents 12*a-n* via event manager 2 or from the event manager 26 itself, and/or receive user-specific baselines from at least one of raw baseline module 31A and reference baseline module 31B. The session lists and/or active lists may be maintained in tables (i.e., master table and/or local tables) in local memory 32. In one embodiment, each record in a data list table represents a user-specific, session-specific event flow. There may be multiple event flows for a single user, for example, if the user engages in multiple sessions of a financial transaction.

Local memory 32 may be any appropriate storage medium and may be located on manager 14 itself, in a cluster containing manager 14, or on a network node accessible to manager 14.

Baseline Generation

The detection of potential intrusions, including fraud during the course of financial transactions, is facilitated by the generation of a reference baseline, which represents a pattern of historical (e.g., normal or anomalous) behavior or business patterns of a user. These patterns in the reference baseline are then used to detect anomalies in the users behavior.

Figure 2:
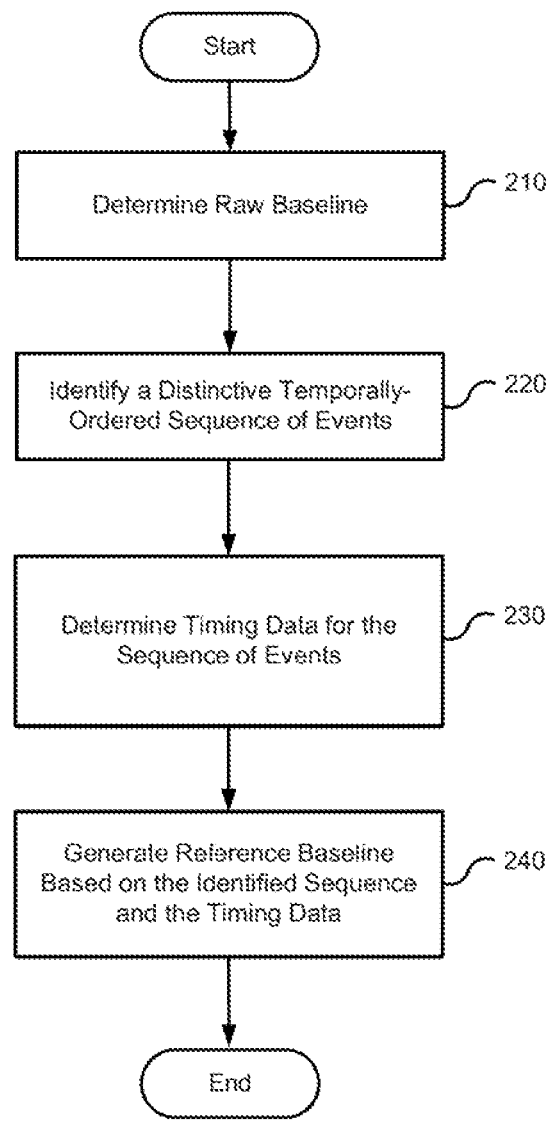
FIG. 2 is a process flow diagram for generation of a reference baseline in accordance with an embodiment.

FIG. 2 is a process low diagram for generation of a reference baseline in accordance with an embodiment. The depicted process flow 200 may be carried out by execution of sequences of executable instructions. In another embodiment, various portions of the process flow 200 are carried out by components of a network security system, an arrangement of hardware logic, e.g., an Application-Specific Integrated Circuit (ASIC), etc. For example, blocks of process flow 200 may be performed by execution of sequences of executable instructions in a raw baseline module of the network security system. The raw baseline module may be deployed, for example, at a manager in the network security system. Furthermore, blocks of process flow 200 may be performed by execution of sequences of executable instructions in a reference baseline module of the network security system. The reference baseline module may be deployed, for example, at a manager in the network security system.

The network security system monitors and analyzes events, such as security events and application events. In the context of web-based financial transactions, the application events may include user activity events/financial transactions events, e.g., navigation by a user through an online financial system for example via web clicks to review a bank balance, initiate a transfer of funds in and out of the user's credit card account, add a payee, update account information, etc. In one embodiment, each page-by-page traversal through the financial system by a particular user and during a particular session (e.g., web session, login session, etc.) is grouped in an event flow. As such, an event flow is a collection of events on a per-user and per-session basis. The user and/or session information of an event may be determined from fields in the event. The events include security events, application events (e.g., financial transactions events), and other types of events generated by agents deployed at systems for which the security system has oversight.

At step 210, a raw baseline is determined. As used herein, a raw baseline is a set of historical event flows and time gap information associated with a particular user. The raw baseline may include event flows of multiple sessions. These event flows make up the historical record associated with a user. In one embodiment, an event flow is organized into a temporally-ordered sequence of events on a per-user and per-session basis. Furthermore, the time gaps between each of the events in the sequence and/or the overall time spent in the session are determined for each event flow. The time gap between one event and the next sequential event may be determined by taking the difference between the time of occurrence of one event and the time of occurrence of the next sequential event.

Table 1 below is an example of a partial raw baseline associated with User 1, as may be contained in an event table of a data list. The raw baseline includes time gap information.

TABLE 1

| User ID | Session ID | Event Type | Time of Occurrence | Time Gap from Prev. Event |
|---|---|---|---|---|
| 1 | 3 | Logon | 1:20:00 pm | — |
| 1 | 3 | View Acct Bal | 1:20:05 pm | 5 sec |
| 1 | 3 | Summary | 1:20:12 pm | 7 sec |
| 1 | 3 | Schedule Payment | 1:23:12 pm | 3 min |
| 1 | 4 | Logon | 11:10:00 am | — |
| 1 | 4 | View Acct Bal | 11:10:05 am | 7 sec |
| 1 | 4 | Summary | 11:10:12 am | 3 sec |
| 1 | 4 | Schedule Payment | 1:13:12 am | 4 min |
| 1 | 5 | Logon | 9:00:00 am | — |
| 1 | 5 | View Acct Bal | 9:00:04 am | 6 sec |
| 1 | 5 | Add Payee | 9:01:04 am | 1 min |
| 1 | 6 | Logon | 3:30:00 pm | — |
| 1 | 6 | Rewards Summary | 3:31:00 pm | 1 min |

An event flow represents a "normal" behavior of the user. In another embodiment, an event flow represents "anomalous" behavior. For example, a post-mortem analysis is performed whereby the event flow is flagged as being either normal or anomalous.

In one embodiment, the raw baseline is constructed on existing historical event flows (including sequences of user action events) from a transaction log, event database, or the like, for example as a batch operation. The raw baseline may then be updated in real-time or in batch mode as new events are received, for example by a manager in a security system.

At step 220, a distinctive, temporally-ordered sequence of events based on the raw baseline. In one embodiment, the event flows and timing data associated with the raw baseline are analyzed and a pattern of business or behavior of the particular user is determined. Pattern recognition or identification may involve merging the event flows in the user-specific raw baseline such that when a pattern is identified, the distinctive sequence of events is represented as a temporally-ordered sequence of events.

In one embodiment, the history of the user's actual page-try-page traversal through a financial system is analyzed for patterns. For example, before scheduling a payment for a monthly credit card bill, it may be gleamed from the raw baseline that the user typically begins a session with a login page on the credit card online site, views the account balance, views a summary of transactions for the current pay period, and finally navigates to the schedule payment page. This pattern is then represented as a temporally-ordered sequence of events.

Furthermore, pattern discovery may be performed, for example, where the number of occurrences of a particular event in a user-specific raw baseline is tracked, and a support graph of user activity may be generated using the raw baseline and the number of occurrences. Pattern discovery is further described in U.S. Pat. No. 7,984,502, filed Oct. 1, 2008, which is hereby incorporated by reference herein in its entirety. Other methods of pattern discovery may also be applied.

At step 230, timing data for the sequence of events is determined based on the raw baseline. In one embodiment, the timing data includes various statistics about the sequence of events such as minimum time, maximum time, average time, and standard deviation.

In one embodiment, all event flows in the raw baseline (for a particular user) having the same sequence of events or subset thereof are grouped together. As previously described, each event flow also includes data about the time gap between each sequential event in the flow. For example, as shown in Table 1, in one event flow (i.e., session ID 3), the time gap between navigation from a login page to a view account balance page is 5 seconds. In another event, flow (i.e., session ID 4), the time gap between these two pages may be 7 seconds.

The minimum time statistic may be the least time that was historically executed by the user when traversing from one particular event to the next sequential event (or another later-occurring event) in an event flow during the course of a session. Using the example as shown in Table 1, there are three event flows which include a traversal from a logon page to a view account balance page. In this example, the minimum time is 5 seconds for traversing from the login page to the view account balance page.

The maximum time statistic may be the most time that was historically executed by the user when traversing from one event to the next sequential event (or another later-occurring event) in an event flow during the course of a session. Using the example as shown in Table 1, the maximum time is 7 seconds for traversing from the login page to the view account balance page.

Likewise, the average time statistics may be the statistical average of all historically-occurring event flows from one particular event to the next sequential event (or another later-occurring event). Using the example as shown in Table 1, the average time is 6 seconds for traversing from the login page to the view account balance page. The standard deviation statistic for the same page-by-page traversal is 1 second, in this example. Other time-based statistics may also be determined.

A reference baseline is generated, at step 240, based on the distinctive sequence of events and the associated timing data. As used herein, a reference baseline is a set of distinctive temporally-ordered sequences of events that have been identified as being representative of a user-specific pattern of business or behavior. The reference baseline also includes the timing data associated with each distinctive sequence of events.

The patterns and the timing data in the reference baseline are used to detect anomalies in the user's behavior. In one embodiment, the reference baseline is generated and/or updated on a fixed schedule. The reference baselines are periodically updated, for example to reflect changes to the ongoing user usage of and interaction with a system, such as a financial system. Updates to the reference baseline may be based on updates that are performed to the corresponding raw baseline.

Table 2 below is an example of a partial reference baseline associated with User 1, as may be generated based on the partial raw baseline of Table 1. The partial reference baseline of Table 2 below includes timing data (e.g., timing statistics),

TABLE 2

| User ID | Reference Pattern ID | Event Type | Avg. Time Gap from Prev. Event | STDV Time Gap from Prev. Event |
|---|---|---|---|---|
| 1 | 1 | Logon | — | — |
| 1 | 1 | View Acct Bal | 6 sec | 2 sec |
| 1 | 1 | Summary | 5 sec | 2 sec |
| 1 | 1 | Schedule Payment | 3.5 min | 1 min |
| 1 | 2 | Logon | — | — |
| 1 | 2 | View Acct Bal | 4 sec | 1 sec |
| 1 | 2 | Add Payee | 1 min | 1 min |
| 1 | 3 | Logon | — | — |
| 1 | 3 | Rewards Summary | 1 min | 30 sec |

At least three distinctive reference patterns are identified in the partial reference baseline of Table 2. Two attributes of timing statistics are included for each event, i.e., the average time gap from a previous event in a sequence, and the standard deviation time gap from a previous event in the sequence. Various other timing statistics may also be included in the reference baseline.

Anomaly Detection

As previously described, the detection of potential intrusions, including fraud during the course of financial transactions, is facilitated by the use of a reference baseline. More specifically, the distinctive sequences in the reference baseline are used to detect anomalies in the user's behavior. Sequences of events in a current session are analyzed according to rides. Rule evaluation may include comparing the sequences of the current session against the historical patterns in the reference baseline. Significant deviations from the reference baseline may result in rule violation and detection of an anomaly, which can be indicative of a potential intrusion.

Figure 3:
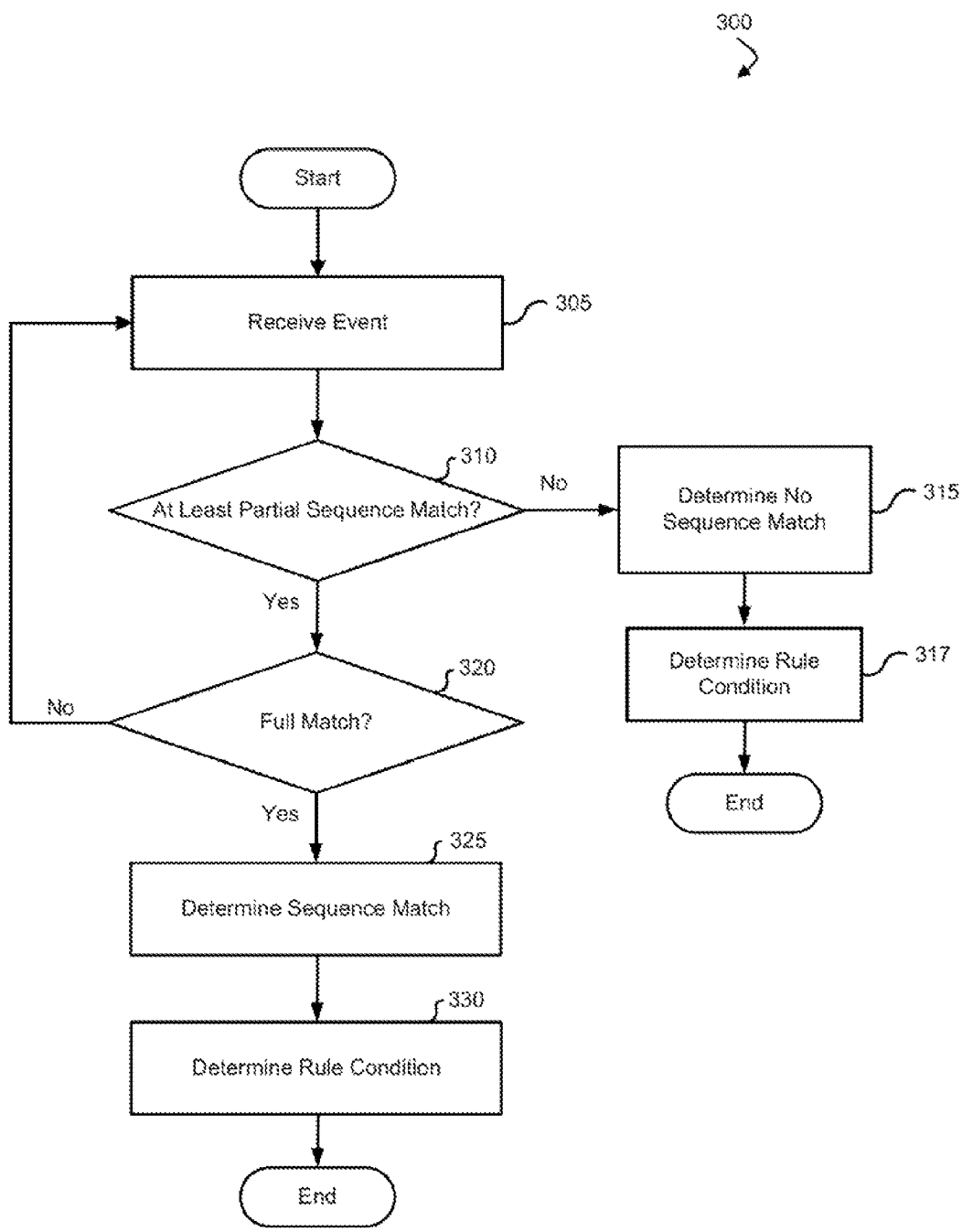
FIG. 3 is a process flow diagram for analysis of user activity events based on deviation from a reference baseline in accordance with an embodiment.

FIG. 3 is a process flow diagram for analysis of user activity events based on deviation from a reference baseline in accordance with an embodiment. The depicted process flow 300 may be carried out by execution of sequences of executable instructions. In another embodiment, various portions of the process flow 300 are carried out by components of a network security system, an arrangement of hardware logic, e.g., an Application-Specific Integrated Circuit (ASIC), etc. For example, blocks of process flow 300 may be performed by execution of sequences of executable instructions in a rules engine of the network security system. The rules engine may be deployed, for example, at a manager in the network security system.

As previously described, the network security system monitors and analyzes events, such as security vents. More specifically, the events are evaluated against rules. The rules may specify specific conditions, which involve the evaluation of temporally-ordered sequences of events and time gaps between those events in the sequence. An example of such a rule may be:

Rule 1

If (Transactional Anomaly) Occurs (by a User ID) (Standard Deviation of Time Gap Up to 1 Standard Deviation for the User ID) then (Action)

For this rule, the condition is "transactional anomaly," where a sequence of events for the user's current session fails to match the reference baseline for that user. Furthermore, the threshold range of validity for finding a rule match is a "standard deviation of time gap up to 1 standard deviation for the User ID," and the aggregation criterion is "by the User ID."

Typically, rule conditions are static, in that a single pattern of activity applies to all users of a transactional system. As described herein, the rule condition in this example involves tracking of a sequence of events to determine if an anomaly is present. When a sequence of a current session is evaluated, the user-specific reference baseline is used as a comparison point. As such, the rules as described herein are not static, but instead, the rule conditions are expressed such that a specific pattern of activity for each user is used to evaluate the current session's sequence of events.

Furthermore, many rule conditions are Boolean in nature, meaning, the conditions are either satisfied or not. As described herein, the rules may specify a deviation threshold or other type of threshold which allows for a range of validity for satisfying the rule condition. The deviation threshold may be expressed such that duplicate, missing, and/or out-of-order events are taken into account, in addition to timing data and/or temporal position data. There may be Boolean conditions which are also a part of the same rule.

At step 305, an event is received for a current session. As each event is received, it is evaluated against various rules in real-time.

The rule evaluation involves matching, on an iterative basis, events of a flow for the current session, to a user-specific reference baseline. In other words, a comparison is performed and it is determined whether the received event in a flow of a current session matches a pattern in the reference baseline. In one embodiment, a rules engine performs this comparison.

Specifically, at step 310, it is determined whether there is at least a partial match with an identified pattern (represented as a distinctive sequence of events) in a user-specific reference baseline. In particular, a user ID associated with the received event is determined. A reference baseline specific for that user ID is identified.

The received event is compared to the reference baseline. In particular, a temporal position of the event within an event flow of a current session is determined. For example, an event with the earliest time of occurrence among the other events in the flow may have the first temporal position, an event with the second earliest time of occurrence may have the second temporal position, etc. The received event is compared to the events in the reference baseline having the same temporal position. Moreover, an attribute of the received event (e.g., event type) is compared to the same attribute of the events in the reference baseline.

A time gap between a time of occurrence of the received event and a time of occurrence of a previous event in the current session or other timing information is tracked. In addition to comparing the temporal position, in one embodiment, the time gap associated with the received event is compared to the timing data in the reference baseline.

During the course of the comparison based on temporal position, timing information, or other attribute, the determination of a match may be static and/or may be based on deviation thresholds. The deviation thresholds specify a tolerance (e.g., range of validity) within which a match is still determined. The tolerance may be implemented as a rule condition.

For example, a user-specific reference baseline may include a sequence of event 1 followed by event 2, with an average time gap of 7 seconds. The reference baseline may include an attribute listing the average time gap between these specific events. For purposes of rule-matching, a current session's sequence of events may be deemed to match the reference baseline as long as the time gap is within the standard deviation of 2 seconds from the average time gap in the reference baseline. The deviation threshold may be expressed with respect to timing data, as described in this example, or with respect to another attribute such as temporal position, such that a tolerance is expressed for missing events or events that occur out-of-order from what is expected. For example, the non-occurrence of some events in a sequence in the reference base may be tolerated, whereas the non-occurrence of others may not be tolerated.

When evaluating the received event, if a partial match is not found, at step 315 it is determined that there is no sequence match between the sequence for which the received event is a part of and the reference baseline.

At step 317, an outcome of the rule condition is determined. The refer baseline may include sequences that are indicative of "normal" user behavior and/or "anomalous" user behavior. In one embodiment, where the reference baseline includes just those sequences indicative of "normal" user behavior, any incoming sequence of a current session that does not match the reference baseline is deemed to be suspect, and the rule condition returns "true" (where the condition is looking for anomalous behavior), at step 317, i.e., a rule fire. Where the reference baseline includes just those sequences indicative of "anomalous" user behavior, any incoming sequence of a current session that does not match the reference baseline is deemed to be non-suspect, and the rule condition returns "false," at step 317.

In another embodiment, where the reference baseline' includes those sequences indicative of "anomalous" and "normal" user behavior, an incoming sequence of a current session that does not match the reference baseline, the rule condition returns "true," resulting in a rule firing since the user's action were unexpected (based on history) and should be investigated. An alert generated from this type of rule firing may be associated with a lower priority level, than, for example, if an anomalous sequence had been matched. In another embodiment, the rule condition returns "false," for example if a policy goal is to minimize the likelihood of false positives or otherwise to limit rule firings to matched anomalous sequences.

When evaluating received event, if a partial match is found at step 310, it is then determined whether there is a full match, at step 320. As used herein, a full match occurs where the flow of events in the current session matches an entire sequence of events in the reference baseline. If there is no full match, processing continues to step 305, where another event in the current sequence is received. The comparisons at step 310 and 320 may occur as a single step, and on an event by event basis in real-time as the events are received by a manager. Matching may also be performed on an aggregate basis, operating on an set of events of the current session at once.

Where a full match is determined at step 320, it is determined that a sequence match is found at step 325. As previously mentioned, an outcome of the rule condition is determined at step 330. The reference baseline may include sequences that are indicative of "normal" user behavior and/or "anomalous" user behavior. In one embodiment, where the reference baseline includes just those sequences indicative of "normal" user behavior, any incoming sequence of a current session that matches the reference baseline is deemed to be non-suspect, and the rule condition returns "false" (where the condition is looking for anomalous behavior). Where the reference baseline includes just those sequences indicative of "anomalous" user behavior, any incoming sequence of a current session that matches the reference baseline is deemed to be suspect, and the rule condition returns "true."

In another embodiment, the reference baseline includes sequences indicative of "anomalous" and/or "normal" user behavior. Where an incoming flow of a current session matches the reference baseline, it is determined whether the matching sequence in the reference baseline is flagged or otherwise marked as "anomalous" or "normal." If the match is with an "anomalous" sequence, the rule condition returns "true," and if the match is with a "normal" sequence, the rule condition returns "false."

For purposes of explanation, a reference baseline associated with a particular user may include three reference baseline flows as shown in Table 2: 1) Event A (Logon), Event B (View Account Balance), Event C (Summary), and Event D (Schedule Payment); 2) Event A (Logan), Event B (View Account Balance), Event E (Add Payee): and 3) Event A (Logon), and Event F (Rewards Summary), in one example. A rule, such as Rule 1 as describe above, is evaluated on the current session's events.

In the current session, for example, Event A is received at step 305. Event A is compared to the reference baseline sequences. Since all three sequences begin with Event A, it is determined that there is at least a partial match. Where there is no match, for example if Event G is received at step 305, it is determined there is no sequence match at step 315. Where the reference baseline includes sequences indicative of normal behavior, a determination of no sequence match leads to characterizing the current session's events as suspicious. A rule condition may return "true" at step 317 in response.

The comparison continues from step 310 to step 320 where it is determined whether there is a full match based on the flow of events (and timing information) already received for the current session. If there is no full match as yet, the system continues to attempt matching with subsequently received events. Specifically, processing continues to step 305, where another event is received. Thus, the matching comparison process occurs in an iterative manner. In a subsequent iteration, at step 310, it is determined whether the current flow of events can be at least partially matched.

Continuing with the example above, if an Event B is received in a second iteration within 5 seconds of Event A, it is determined that the current session's flow (which now includes Event A followed by Event B) at least partially matches with a both reference pattern ID 1 and reference pattern ID 2, based on the deviation tolerance specified in Rule 1.

At step 320, it is determined whether there is a full match as yet. At this point, the current flow includes just Event A and Event B. To be a full match with the reference pattern ID 1, the flow of the current session should also include Events C and D within the deviation tolerance. Likewise, to be a full match with the reference pattern ID 2, the flow should also include Event E within the deviation tolerance. As such, there is no full match. The system may then iterate again, and next event is received at step 305.

Once a full match is determined at step 325, rule conditions are determined at step 330. Where the reference baseline includes sequences indicative of normal behavior, the current session events are characterized as normal and the rule condition returns "false" at step 330.

In one embodiment, the reference baseline may include sequences of normal activity and/or anomalous activity. In other words, an event sequence that a user has taken in the past, which therefore might be represented in the reference baseline, may be a normal event flow or an anomalous flow. For example, the first time a user executes a particular sequence, the current flow may not match at step 310, resulting in a determination of no sequence match at step 315.

The new sequence may be fed back to the reference baseline generation flow at FIG. 2, for updating the raw baseline and/or reference baseline. The system does not know whether this current sequence is a normal activity or an anomalous activity, for example, until after a post-mortem analysis is performed. During the post-mortem analysis, the user may possibly be contacted and asked to validate the activity. The user may enter the result and thereby flag the new sequence as normal or anomalous. If normal, the new sequence is added to the raw baseline so that future matching event sequences will find a match and not fire the rule. If anomalous, the new sequence may also be added to the baseline but flagged as anomalous, such that future matches to this pattern will cause the rule to be fired. As such, a rule may be fired if either no flow match is found, as shown in FIG. 3, or a match is found with a flow that is flagged as anomalous and/or otherwise suspicious.

Figure 4:
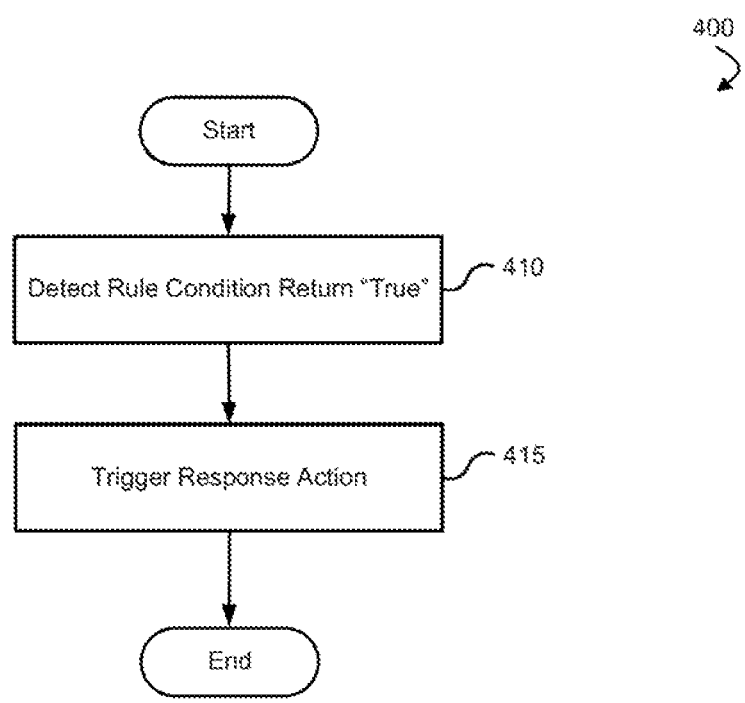
FIG. 4 is a process flow diagram for triggering a response action in accordance with an embodiment.

FIG. 4 is a process flow diagram for triggering a response action in accordance with an embodiment. The depicted process flow 400 may be carried out by execution of sequences of executable instructions. In another embodiment, various portions of the process flow 400 are carried out by components of a network security system, an arrangement of hardware logic, e.g., an Application-Specific Integrated Circuit (ASIC), etc. For example, blocks of process flow 400 may be performed by execution of sequences of executable instructions in a rules engine of the network security system. The rules engine may be deployed, for example, at a manager in the network security system.

At step 410, it is detected that a rule condition returned "true," for example after an event in a current session was evaluated against the rule. At step 415, an action may be triggered in response.

The actions triggered by the rules may include executing a pre-determined command or script, updating a data list, logging an alert, sending alerts to a console or notification designees, setting custom severity levels for the alert based on cumulative activity, adding a source to a list of suspicious sources, adding a target to a vulnerability list, triggering another rule, or any combination of these actions.

Furthermore, the action may include triggering another rule. For example, the information from transactional events corresponding to a user's interaction with an online account may be further correlated with network security events and with knowledge of the network infrastructure including but not limited to asset model, vulnerabilities of various machines and other attacks that are underway in the system in real-time, as the simultaneous presence of attacks and detected anomalies may increase the likelihood of fraud. As such, correlation may be performed for multiple data sources.

In other words, the separate rule may include rule conditions that look for fraud-related rule firings and also look for security-related rule firings, for example for a target host. When the conditions are satisfied, correlation may be performed thereby bridging transactional or fraud-based event knowledge with security data.

In one embodiment, the action includes generating a correlation event. The correlation event may include information about the base events that triggered the rule in addition to rule-specific information. In one embodiment, the correlation event may be used for condition-matching thus allowing chaining of multiple rules.

Figure 5:
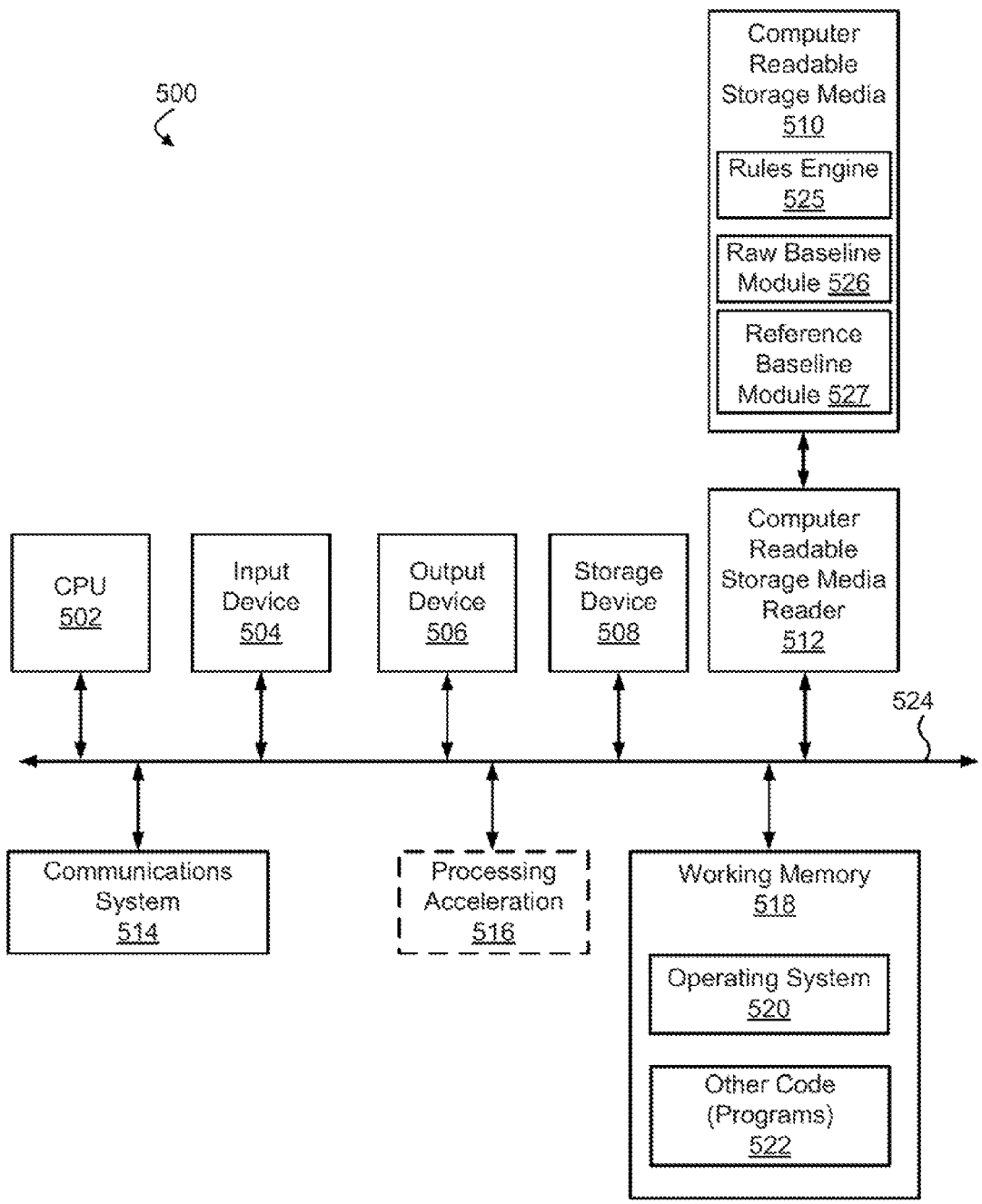
FIG. 5 illustrates a computer system in which an embodiment may be implemented.

FIG. 5 illustrates a computer system in which an embodiment may be implemented. The system 500 may be used to implement any of the computer systems described above. The computer system 500 is shown comprising hardware elements that may be electrically coupled via a bus 524. The hardware elements may include at least one central processing unit (CPU) 502, at least one input device 504, and at least one output device 506. The computer system 500 may also include at least one storage device 508. By way of example, the storage device 508 can include devices such as disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 512, a communications system 514 (e.g., a modem, a network card (wireless or wired), an infra-red communication device, etc.), and working memory 518, which may include RAM and ROM devices as described above. In some embodiments, the computer system 500 may also include a processing acceleration unit 516, which can include a digital signal processor (DSP), a special-purpose processor, and/or the like.

The computer-readable storage media reader 512 can further be connected to a computer-readable storage medium 510, together (and in combination with storage device 508 in one embodiment) comprehensively representing remote, local, fixed, and/or removable storage devices plus any tangible non-transitory storage media, for temporarily and/or more permanently containing, storing, transmitting, and retrieving computer-readable information (e.g., instructions and data). Computer-readable storage medium 510 may be non-transitory such as hardware storage devices (e.g., RAM, ROM, EPROM (erasable programmable ROM), EEPROM (electrically erasable programmable ROM), hard drives, and flash memory). The communications system 514 may permit data to be exchanged with the network and/or any other computer described above with respect to the system 500. Computer-readable storage medium 510 includes a rules engine 525, raw baseline module 526, and a reference baseline module 527.

The computer system 500 may also comprise software elements, which are machine readable instructions, shown as being currently located within a working memory 518, including an operating system 520 and/or other code 522, such as an application program (which may be a client application, Web browser, mid-tier application, etc.). It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

The specification and drawings are, accordingly, to be regarded in an illustrative rather than a restrictive sense. It will, however, be evident that various modifications and changes may be made.

Each feature disclosed in this specification including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

What is claimed is:

1. A method for evaluation of events, implemented by a physical processor executing computer readable instructions, the method comprising:
   generating, by the processor, a user-specific reference baseline comprising a set of temporally-ordered sequences of events identified from page-by-page traversal data of the user through a financial system, wherein the reference baseline includes timing statistics for each of the sequence of events;
   receiving, by the processor, an event of a sequence of events in a current session;
   determining, by the processor, whether the event at least partially matches the reference baseline using an attribute of the event and based on a temporal position of the event within the sequence of events in the current session; and
   analyzing, by the processor, a condition of a rule based on the determination of whether the event at least partially matches the reference baseline.

2. The method of claim 1, wherein the reference baseline further comprises timing data associated with each sequence in the set of temporally-ordered sequences of events, wherein each sequence in the set is a distinctive pattern of historical events associated with the user.

3. The method of claim 1, wherein determining, by the processor, whether the event at least partially matches the reference baseline comprises:
   identifying, by the processor, the user-specific reference baseline among a plurality of reference baselines based on a user identifier associated with the received event.

4. The method of claim 1, wherein determining, by the processor, whether the event at least partially matches the reference baseline further comprises determining whether the attribute of the received event is within a deviation threshold specified in the condition of the rule.

5. The method of claim 1, wherein at least one sequence in the set of temporally-ordered sequences of events is flagged, by the processor, as being either normal user behavior or anomalous user behavior.

6. The method of claim 5, wherein analyzing, by the processor, the condition of the rule comprises:
   determining, by the processor, the rule condition is "false" if the event matches the at least one sequence which is flagged as normal user behavior; and
   determining, by the processor, the rule condition is "true" if the event matches the at least one sequence which is flagged as anomalous user behavior.

7. The method of claim 1, wherein determining, by the processor, whether the received event at least partially matches the reference baseline comprises:
   tracking, by the processor, a time gap between a time of occurrence of the received event and a time of occurrence of a previously received event of the sequence of events in the current session.

8. The method of claim 1, wherein each sequence in the set of temporally-ordered sequences of events is associated with timing data generated using a time of occurrence of events in a raw baseline.

9. A system for evaluation of events, the system comprising:
   a physical processor implementing machine readable instructions stored on a non-transitory machine-readable storage medium that cause the system to:
      store a data list including a plurality of user-specific reference baselines;
      generate a first user-specific reference baseline of the plurality of user-specific reference baselines, the first user-specific reference baseline comprising a set of temporally-ordered sequences of events, wherein each reference baseline includes timing statistics for each of the sequence of events;
      receive an event of a sequence of events in a current session;
      determine whether the event at least partially matches the reference baseline using an attribute of the event and based on a temporal position of the event within the sequence of events in the current session;
      analyze a condition of a rule based on the determination of whether the event at least partially matches the reference baseline; and
      generate a correlation event.

10. The system of claim 9, wherein the reference baseline further comprises timing data associated with each sequence in the set of temporally-ordered sequences of events, wherein each sequence in the set is a distinctive pattern of historical events associated with the user.

11. The system of claim 9, wherein the physical processor implements machine readable instructions that cause the system to determine whether the event at least partially matches the reference baseline by:
   identifying the user-specific reference baseline among a plurality of reference baselines based on a user identifier associated with the received event;
   selecting an event in a sequence of the reference baseline having the same temporal position as the temporal position of the received event;
   comparing the attribute of the received event to a same attribute of the event in the reference baseline, wherein the attribute of the received event is an event type.

12. The system of claim 11, wherein the physical processor implements machine readable instructions that cause the system to determine whether the event at least partially matches the reference baseline by:
   determining whether the attribute of the received event is within a deviation threshold specified in the condition of the rule.

13. The system of claim 9, wherein at least one sequence in the set of temporally-ordered sequences of events is flagged as being either normal user behavior or anomalous user behavior.

14. A non-transitory computer-readable medium storing a plurality of instructions to control a data processor to evaluate events, the plurality of instructions comprising instructions that cause the data processor to:
   generate a user-specific reference baseline, the reference baseline comprising a set of temporally-ordered sequences of transactional events identified from page-by-page traversal data of the user through a financial system, wherein the reference baseline includes timing statistics for each of the sequence of events;
   receive a transactional event of a sequence of transactional events in a current session;
   determine whether the transactional event at least partially matches the reference baseline using an attribute of the transactional event and based on a temporal position of the transactional event within the sequence of transactional events in the current session;
   analyze a condition of a rule based on the determination of whether the transactional event at least partially matches the reference baseline; and
   correlate the transactional event with a security-related event.

15. The non-transitory computer-readable medium of claim 14, wherein the instructions that cause the data processor to determine whether the event at least partially matches the reference baseline comprise instructions that cause the data processor to:
   identify the user-specific reference baseline among a plurality of reference baselines based on a user identifier associated with the received event;
   select an event in a sequence of the reference baseline having the same temporal position as the temporal position of the received event; and
   compare the attribute of the received event to a same attribute of the event in the reference baseline, wherein the attribute of the received event is an event type.

16. The method of claim 1, further comprising determining, by the processor, an average time gap from a previous event in the sequence of events, wherein the timing statistics includes the determined average time gap.

17. The method of claim 1, further comprising determining, by the processor, a standard deviation time gap from a previous event in the sequence of events, wherein the timing statistics includes the determined standard deviation time gap.

18. The method of claim 7, wherein determining, by the processor, whether the received event at least partially matches the reference baseline comprises comparing, by the processor, the time gap to timing data of the reference baseline.

19. The method of claim 1, wherein determining, by the processor, whether the event at least partially matches the reference baseline comprises selecting, by the processor, an event in a sequence of the reference baseline having the same temporal position as the temporal position of the received event.

20. The method of claim 1, wherein determining, by the processor, whether the event at least partially matches the reference baseline comprises comparing, by the processor, the attribute of the received event to a same attribute of the event in the reference baseline, wherein the attribute of the received event is an event type.

* * * * *